United States Patent [19]

Herbulot et al.

[11] Patent Number: 4,773,388
[45] Date of Patent: Sep. 27, 1988

[54] FRICTION HEAT GENERATOR SUITABLE FOR AUTOMOBILE VEHICLES

[75] Inventors: Jean Herbulot, Franconville; Alain Vanderschuren, Saint Ouen; Alain Risbet, Franconville, all of France

[73] Assignee: Valeo, Paris, France

[21] Appl. No.: 9,249

[22] Filed: Jan. 30, 1987

[30] Foreign Application Priority Data

Feb. 3, 1986 [FR] France ................ 86 01456

[51] Int. Cl.⁴ ................................. F24C 9/00
[52] U.S. Cl. ..................... 126/247; 122/26; 237/1 R
[58] Field of Search ............ 122/26; 126/247; 237/1 R

[56] References Cited

U.S. PATENT DOCUMENTS

| 1,766,227 | 6/1930 | Savage Arms . | |
|---|---|---|---|
| 4,027,631 | 6/1977 | Lavery | 122/26 |
| 4,295,461 | 10/1981 | Cummings | 126/247 |
| 4,325,354 | 4/1982 | Fuchs | 122/26 X |
| 4,424,796 | 1/1984 | Fish | 122/26 X |

FOREIGN PATENT DOCUMENTS

| 458259 | 10/1913 | France . |
| 40448 | 6/1932 | France . |
| 1016348 | 11/1952 | France . |
| 2522765 | 9/1983 | France . |
| 2530321 | 1/1984 | France . |
| 452990 | 9/1936 | United Kingdom . |

Primary Examiner—Henry A. Bennet
Attorney, Agent, or Firm—Charles E. Brown; Charles A. Brown

[57] ABSTRACT

A heat generator comprises a casing in which are mechanical friction members. A shaft driven by a motor rotates the friction members. A modulator device responsive to the speed of the shaft applies to the friction members a clamping force conditioned by the shaft speed. The heat generator further comprises a system for interfacing a heat-exchange fluid to the casing.

36 Claims, 4 Drawing Sheets

FRICTION HEAT GENERATOR SUITABLE FOR AUTOMOBILE VEHICLES

BACKGROUND OF THE INVENTION

1. Field of the Invention

The invention concerns a friction heat generator driven by a motor more specifically adapted to provide additional heating for the cabin of a vehicle fitted with a generator of this kind and/or for obtaining and maintaining an adequate operating temperature of the motor of the vehicle, even at idling speeds.

2. Description of the Prior Art

There are known additional heating installations for automobile vehicles in which heat is generated by maintaining a circulation of fluid and causing a loss of head in the fluid flow. Numerous proposed systems comprise a restriction and a pump forcing a liquid through the restriction. Other known systems use vaned members one of which is prevented from rotating and between which a liquid is circulated, becoming heated as a result of sustained friction between the vaned members.

The invention relates to another heat production concept utilizing friction members immersed in a heat-exchange fluid.

The invention is more particularly directed to an improvement whereby the heat energy produced can be adapted at will according to the speed of the motor driving certain friction members, that is to say in most cases the motor of the automobile vehicle itself.

SUMMARY OF THE INVENTION

The present invention consists in a heat generator comprising a casing, mechanical friction means in said casing, a shaft adapted to be driven by a motor and adapted to rotate said friction means, means for sensing the speed of said shaft, modulator means responsive to said shaft speed adapted to apply to said friction means a clamping force conditioned by said shaft speed and means for interfacing a heat-exchange fluid to said casing.

The means for modulating the clamping force on said mechanical friction means will typically employ centrifugal force and will be designed so as to make the heat energy produced relatively independent of the motor speed whilst allowing the mechanical friction means to be slackened off when stationary and at very low rotational speeds. In other words, the modulator means will generally be designed to cause progressive clamping up over a certain range of low speeds until the designed specific heat energy output is obtained and to slacken off the mechanical friction means progressively as a function of the speed in order to stabilize the heat energy output.

The heat-exchange fluid may be interfaced directly, by having it pass through the casing, or indirectly by using a double-walled casing.

As will be described in more detail later, the modulation of the clamping force on the mechanical friction means may be achieved either by mechanical centrifugal action using flyweights or balls operative on the clamping means or by hydraulic action using the centrifugal pressure of the heat-exchange fluid in the casing and/or the pressure in the casing, where this increases with the rotation speed of a pump driven by the aforementioned motor. The hydraulic and mechanical centrifugal actions may be combined, of course.

The invention will be better understood and other advantages of the invention will emerge more clearly from the following description of various embodiments of heat generator in accordance with the invention, given by way of example only and with reference to the appended drawings.

DESCRIPTION OF THE PREFERRED EMBODIMENTS

Figure 1:
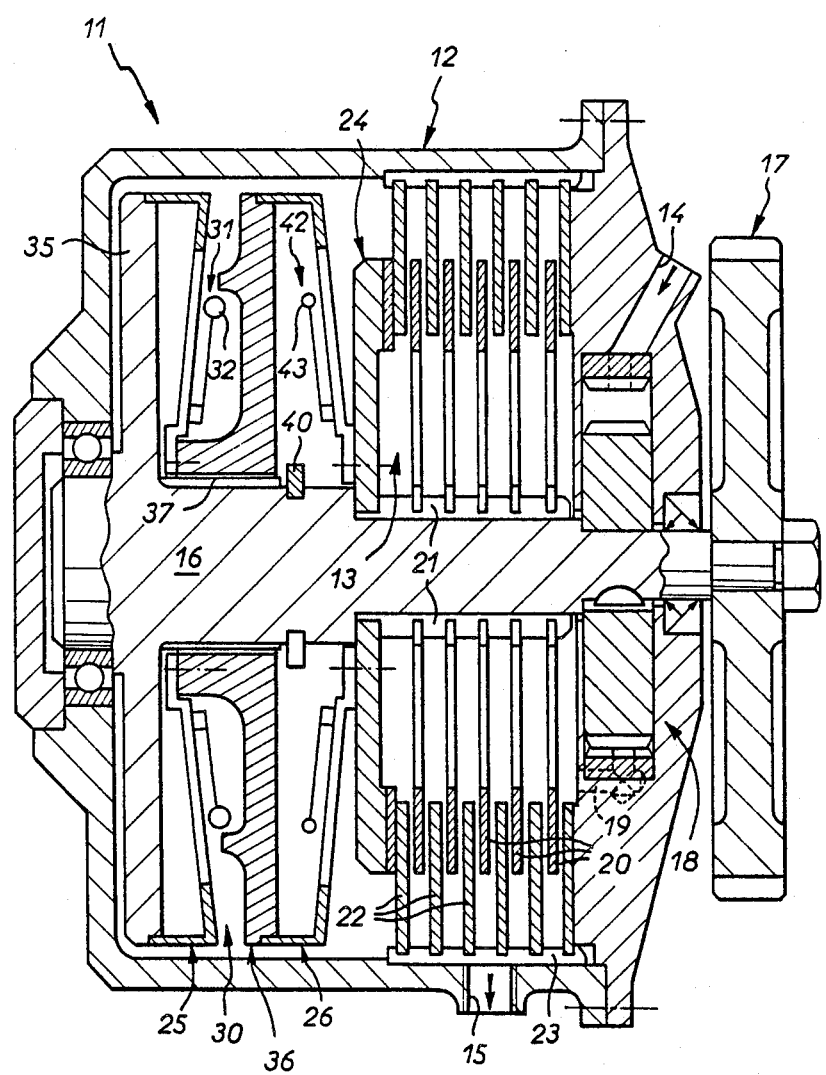
FIG. 1 is a schematic representation of the heat generator when inoperative and in longitudinal cross-section.

Referring to FIG. 1, there is shown a heat generator 11 comprising a casing 12 in which there is formed a housing 13 within which a heat-exchange fluid (oil or glycol-water mixture) circulates between an inlet 14 and an outlet 15. A shaft 16 is disposed to rotate within the casing 12. The shaft is driven by a toothed wheel 17, or alternatively by a pulley wheel, coupled to a motor (not shown), usually the motor of an automobile vehicle in which the heat generator is installed. A variable throughput gear pump 18 is disposed in the casing 12 and driven by the shaft 16. The heat-exchange fluid inlet 14 communicates with the pump 18 which discharges the heat-exchange fluid into the housing 13 through a pipe 19. The housing 13 accommodates mechanical friction means operative with variable clamping force. To be more precise, these means comprise first friction disks 20 constrained to rotate with the shaft 16 and movable axially along it by means of longitudinal splines 21 formed on the surface of the shaft and second friction disks 22 alternating with the first friction disks and also movable in the housing 13 in the same axial direction, although they are prevented from rotating. To this end longitudinal splines 23 are formed on the inside surface of the housing 13 and the disks 22 slide along these splines. A clamping plate 24 is mounted to slide axially along the shaft 16, being engaged on the longitudinal splines 21 so as to be driven in rotation by the shaft 16. This clamping plate also carries one of the friction disks 20. The mechanical friction means are associated with clamping control means 30 that comprise a first axially acting diaphragm spring 25 and a second axially acting diaphragm spring 26 operative to urge the clamping plate 24 against the disks 20 and 22 so as to clamp them together. The clamping control links 30 are adapted to modulate the clamping force on the disks as the speed of the motor driving the shaft 16 varies.

The outside edge of the diaphragm spring 25 is coupled to a disk 35 fastened to the shaft 16 and to an intermediate plate 36 constrained to rotate with the shaft 16 and sliding longitudinally relative to it by virtue of a system of splines and grooves 37. The outside edge of the second diaphragm spring 26 is coupled to the intermediate plate 36 and its central annular area coupled to the clamping plate 24. Thus any displacement of the central annular area is of the diaphragm spring 25 influences the clamping force on the friction disks 20 and 22 through the intermediary of the intermediate plate 36 and the second diaphragm spring 26. The diaphragm spring 25 is inclined in the opposite direction to the diaphragms spring 26 and the degree to which the diaphragm springs 25 and 26 are prestressed is determined so that at low shaft rotation speeds there is a clearance between the intermediate plate 36 and an abutment member 40 fastened to the shaft 16, there being virtually no clamping force on the mechanical friction means at this time. According to an important feature of the invention the means for modulating the clamping force on the disks 20, 22 comprise a first centrifugal system including spring means, in this instance the first diaphragm spring 25, and designed to be operative in a direction tending to increase progressively the clamping force as a function of the speed of the shaft 16 over a predetermined lower range of shaft speeds. This first centrifugal system comprises a first set of flyweights 32 driven in rotation by the shaft 16 and co-operating with the first diaphragm spring 25 so as to deform it by flexing it as a result of centrifugal force in a direction tending to move it towards the clamping plate 24 (entraining the intermediate plate 36 and the second diaphragm spring 26) so as to initiate and increase progressively the clamping force on the first and second friction disks 20 and 22. The flyweights of the set 32 are fixed to the ends of flexible rods themselves fixed to the first diaphragm spring 25. The inclination of the diaphragm spring and thus of these rods relative to the shaft 16 is such that as they progressively straighten up due to centrifugal force they deform the diaphragm spring and move its central part towards the right as seen in FIG. 1. The abutment member 40 disposed between the intermediate plate 36 and the clamping plate 24 limits displacement of the intermediate plate 36 due to the action of the diaphragm spring 25 so that, beyond a specific rotation speed, the effect of the first centrifugal system 31 on the clamping force on the friction disks 20 and 22 is limited to a maximum value corresponding to a certain degree of stressing of the diaphragm spring 26 due to displacement of the intermediate plate 36.

In accordance with another advantageous feature of the invention, the modulator means further comprise a second centrifugal system 42 including the second diaphragm spring 26 of the clamping control means, in an arrangement tending to decrease progressively the clamping force as the speed of the shaft 16 increases. To this end a second set of flyweights 43 is driven in rotation by the shaft 16 and co-operates with the second diaphragm spring 26 to deform it by flexing by virtue of centrifugal force in a direction tending to move it away from the clamping plate 24 so as to reduce progressively the clamping force on the first and second friction disks 20 and 22. As with the flyweights of the first set, the flyweights of the second set are mounted at the end of flexible rods themselves fixed to the diaphragm spring 26 and the inclination of the diaphragm spring 26 and of these rods relative to the shaft 16 is such that as they straighten up due to centrifugal force they progressively deform the diaphragm spring 26, causing it to move to the left as seen in FIG. 1.

The heat generator that has just been described operates in an extremely simple way that is obvious from the foregoing description. When the motor driving the heat generator is started up the disks 20 and 22 are unclamped so that, ignoring any possible residual drag torque, the heat generator does not offer any resistive torque to starting of the motor. As soon as the shaft 16 is rotating the action of the diaphragm spring 26 and of the set of flyweights 32 takes precedence over the action of the diaphragm spring 26 and the set of flyweights 43 (because the flyweights of the first set are heavier than the flyweights of the second set, for example) with the result that the diaphragm spring 25 begins to be deformed and to entrain in succession the intermediate plate 36 and the second diaphragm spring 26 and so brings about progressive clamping up of the friction disks 20 and 22. The heat output of the heat generator thus increases progressively up to a specific value corresponding to a predetermined rotation speed of the shaft 16. Once this speed is reached the intermediate plate 36 is immobilized against the abutment member 40 and the heat output stabilizes at a specific value. For any subsequent increase in the speed of the shaft 16 the second set of flyweights 43 can then operate as a regulator system tending to slacken off the clamping of the disks 20 and 22 in order to maintain the heat output at a substantially constant value.

Figure 3:
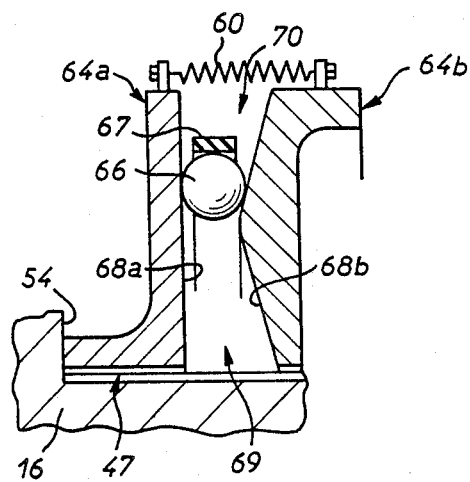
FIG. 3 is a view analogous to FIG. 2 showing an alternative embodiment of the modulator means.
Figure 4:
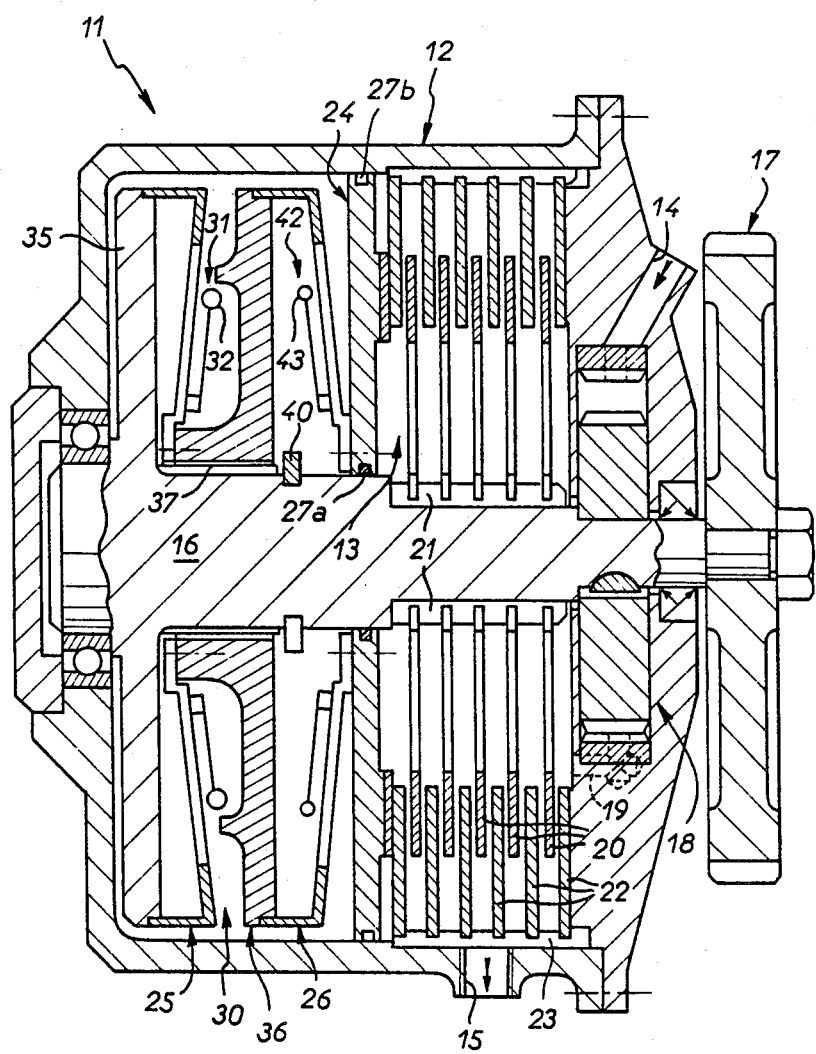
FIG. 4 is a view analogous to FIG. 1 showing an alternative embodiment of the heat generator.

On the basis of the embodiment in FIG. 1 it is possible to produce the variant of FIG. 4 in which the aforementioned modulator means include a specific arrangement of the clamping plate 24 to exploit the variation in the pressure of the heat-exchange fluid in the housing 13 with changes in the speed of the shaft 16. All that is necessary is to modify the shape of the plate 24 and the way in which it is mounted so that it can slide in fluid-tight manner on the shaft 16, on the one hand, and along the inside wall of the casing 12, on the other hand, by means of respective seals 27a, 27b, whereby the the plate is converted to a mobile wall of the housing 13 responsive to variations in the pressure of the heat-exchange fluid passing through the housing. As the heat-exchange fluid is fed into the housing 13 by the gear pump 18 driven by the shaft 16, the throughput of this pump thus varying with the speed of the shaft, the pressure at the periphery of the housing 13 increases in proportion to the speed of the shaft 16. With this specific adaptation of the plate 24 any increase in pressure in the housing 13 moves the plate in a direction tending to slacken off the clamping of the friction disks 20 and 22 and so to limit the heat output. It is therefore possible to combine the effect of this specific adaptation of the plate 24 with that of the second centrifugal system as described hereinabove, and possibly to dispense with the latter. This specific adaptation of the plate 24 may also be adopted in the case of the embodiments now to be described with reference to FIGS. 2 and 3.

In these embodiments the modulator means comprises at least two plates the distance between which is variable and which are mounted so as to be movable axially on the shaft 16 but constrained to rotate with it by means of a system of splines and grooves 47 on the shaft 16 and the plates in question. The flyweights consist of heavy steel balls 49 and are trapped between the plates and constrained to take up a position between them at a certain radial distance from the shaft 16, depending on the centrifugal force imparted to them, while at least one of the plates has its surface in contact with the balls shaped to define a distance between the plates (in the immediate vicinity of the shaft 16, for example) which varies as a function of the speed of the shaft 16 due to the corresponding displacement of the balls. Because these plates are disposed on the shaft 16 in such a way that variations in their position are communicated to the clamping plate 24, the variable spacing of the plates defines a predetermined law governing modulation of the clamping force on the mechanical friction means, this law depending on the profile of the facing surfaces of the plates. One of the variable spacing plates (in this instance that farthest to the right in FIGS. 2 and 3) may be the clamping plate itself.

Figure 2:
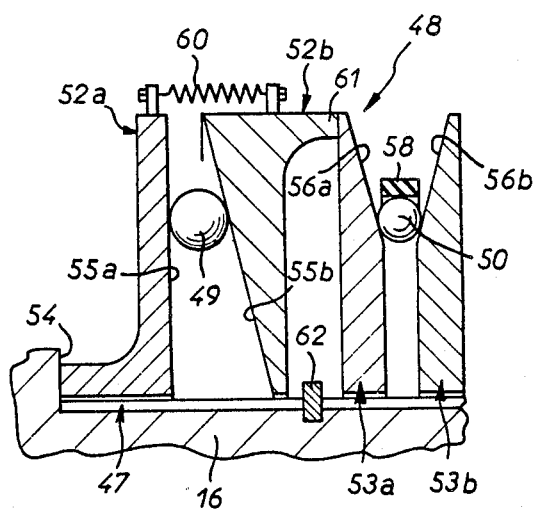
FIG. 2 is a schematic detail view showing one embodiment of the clamping force modulator means.

In the FIG. 2 embodiment the modulator means 48 comprise two pairs of variable spacing plates 52a, 52b and 53a, 53b disposed in sequence (from left to right in the drawings) along the shaft 16. Thus, as mentioned above, the plate 53b may be the previously mentioned clamping plate, fulfilling the same role as the plate 24 in FIG. 1. The plate 52a may co-operate abutment-fashion with a shoulder 54 on the shaft 16. It may equally well be immobilized relative to the shaft. A first set of balls 49 is confined between the plates 52a, 52b of the first pair while a second set of flyweights in the form of lighter balls 50 is confined between the plates 53a, 53b of the second pair. The facing surfaces 55a, 55b of the plates 52a, 52b define a space decreasing in size radially outwards for any relative position of the plates. To be more precise, the surface 55a of the plate 52a in perpendicular to the shaft 16 whereas the profile of a radial cross-section through the surface 55b of the plate 52b is a straight line inclined towards the plate 52a in the direction away from the shaft 16. The facing surfaces 56a, 56b of the plates 53a, 53b define a space increasing in size radially outwards, at least from a certain radial distance from the shaft 16, for any relative position of the plates. To be more precise, the profile of a radial cross-section through each surface 56a, 56b comprises, in the direction away from the shaft 16, a straight portion perpendicular to the shaft extended by another straight portion diverging from the other plate.

The balls of the second set 50 are confined between the plates 53a, 53b by spring means in the form of a radially acting spring washer 58. The plates 52a, 52b of the first pair are urged axially towards each other by spring means such as axially acting helical coil springs 60 disposed in tension between the plates. Finally, the plate 52b of the first pair nearer the plate 56a of the second pair comprises an engagement collar 61 enabling it to come into contact with the plate 56a to push back the second pair of plates in a direction tending to increase the clamping force on the mechanical friction means. The axial travel of the plate 52b is limited by an abutment member 62 fastened to the shaft 16.

This second embodiment operates in a similar way to that of FIG. 1. As previously, the action of the first set of flyweights 49 and the spring means 60 takes precedence over the action of the second set of flyweights 50 and the spring means 58. When the shaft 16 is not rotating the friction disks are released, as previously, but as soon as the shaft 16 begins to rotate the balls 49 begin to move away from the shaft 16 due to centrifugal force and move apart the plates 52a, 52b which progressively push back the plates of the second pair so as to increase the clamping force on the friction disks 20, 22 progressively until, at a predetermined speed, the plate 52b is immobilized by the abutment member 62. If the speed at which the shaft 16 is driven should increase further the clamping force on the friction disks is then limited to a maximum value until the clamping force is progressively reduced, stabilizing the heat output, because of radial displacement of the second set of balls 50 moving the plates 53a, 53b towards each other.

The FIG. 3 embodiment comprises only two variable spacing plates 64a, 64b mounted to slide relative to the shaft 16 and driven in rotation by the shaft by means of a system of splines and grooves 47 similar to that of FIG. 2; the plate 64a is also similar to the plate 52a in FIG. 2 and also bears against a shoulder 54 on the shaft 16. The two plates are urged axially towards each other by spring means similar to those in FIG. 2, that is to say by tension springs 60. A set of balls 66 is trapped between the two plates 64a, 64b an held between the plates by spring means also similar to those in FIG. 2, that is to say a spring washer 67. In this embodiment the plates, more specifically the plate 64b in this instance, have their facing surfaces 68a, 68b shaped to define, in radial sequence, a first space 69 decreasing in size radially outwards and then a second space 70 increasing in size radially outwards. This is achieved by the specific profile, as seen in radial cross-section, of the surface 58b of the plate 64b, which comprises two straight portions inclined relative to the shaft 16 which, in the direction away from the shaft, converge towards and then diverge from the plate 64a. The plate 64b can serve as the clamping plate. This embodiment operates in a very similar way to the previous embodiment. The balls 66 forming the first and second sets of flyweights, the action of the spring means 60 takes precedence over that of the spring means 67. As long as the balls 66 are located in the first space 69, that is to say for a lower range of speeds of the shaft 16, the plates 62a and 64b tend to move apart as a result of the centrifugal force applied to the balls 66. Thus the clamping force on the friction disks is progressively increased. If the speed increases further the balls 66 enter the second space 70 and the plates 64a, 64b move progressively nearer together, reducing the clamping force on the friction disks so as to stabilize the heat output.

The FIG. 2 and 3 embodiments make it possible to achieve any law governing modulation of the clamping force on the friction disks as a function of the rotation speed of the shaft 16 by appropriately choosing the profile of the facing surfaces of the various pairs of plates.

There may be added to each embodiment of the device as just described an electromagnetic clutch inserted between the shaft 16 and the drive motor, usually the vehicle motor. This electromagnetic clutch could be controled by thermostatic control means (not shown) thermally interfaced directly or indirectly to the heat-exchange fluid circulating in the housing 13 or to the member to be heated. The set point value for the thermostatic control means could be controlled from the cabin of the vehicle.

Where the motor driving the shaft 16 is the vehicle motor, there could be advantageously inserted between the motor and the shaft 16 a limited speed range variable speed drive, for example a centrifugal variable speed drive using pulleys and a belt, known per se, as described in example in French patent application No. 82 03 484. The insertion of this variable speed drive would make it possible to achieve an adequate heat output even at the lowest motor rotation speeds.

It is also obvious from the foregoing description that the action of the first set of flyweights and spring means could be made to take precedence over that of a second set of flyweights and spring means by adjusting the clamping force on the spring means and/or the flyweights, whereby a high degree of accuracy could be achieved in respect of generator heat output. For example, with reference to FIG. 1, the weight of the flyweights 43 could be increased and the load on the diaphragm spring 25 reduced and/or the load on the diaphragm spring 26 increased and the weight of the flyweights 32 reduced. Thus the flyweights 32 could be lighter than the flyweights 43.

It is to be understood that the present invention is not limited to the embodiments shown; for example, the diaphragm spring 25 and the first set of flyweights could be associated with the balls 50 and the spring washer 58 of FIG. 2. In other words, the solutions explained with reference to FIG. 1, on the one hand, and with reference to FIGS. 2 and 3, on the other hand, may be combined.

Figure 5:
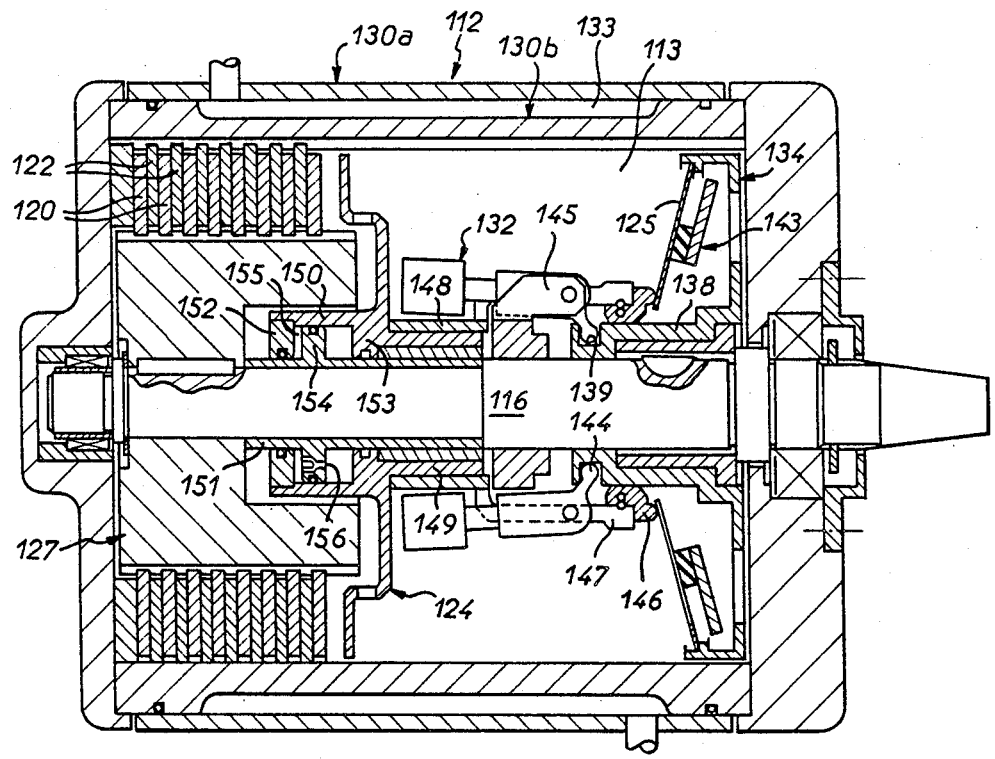
FIG. 5 is a view analogous to FIG. 1 showing a further embodiment of the heat generator.

Reference should now be had to FIG. 5, where structural members analogous to those of FIG. 1 carry the same reference numbers increased by 100; the figure shows another embodiment in which only one spring member or diaphragm spring 125 is used, on which are operative respective first and second sets of flyweights 132, 143.

The cylindrical part of the casing 112 comprises two tubular portions 130a and 130b forming a double wall delimiting an annular space 133 through which a heat-exchange fluid can be circulated, in this instance water from the cooling circuit. The housing 113 is closed and filled with oil. This thermal interfacing mode for evacuating the heat energy produced could, of course, by readily adapted to the embodiments of FIGS. 1 through 4.

In this embodiment an annular diaphragm spring 125 has its outside edge in contact with a plate 134 perpendicular to the shaft 116 and fastened to a sleeve 138 sliding on the shaft but constrained to rotate with it by a conventional groove and key system. The sleeve comprises a groove 139 in which are inserted the ends of levers 144 projecting from the flyweights 132 of the first set. These flyweights, of which there are three in this instance, are pivotally mounted on a support 145 fixed to the shaft 116. In other words, the flyweights of the first set are rotationally coupled to the shaft 116 and coupled by shaped links 139, 144 to the diaphragm spring, in order to deform it by virtue of the centrifugal force exerted on them in a direction tending to move it towards the clamping plate, that is to say in a direction tending to increase the clamping force on the disks 120 and 122. The disks 120 are rotationally coupled to the shaft 116 through a hub 127 fixed to the latter. The inside edge of the diaphragm spring 125 bears against a ring 146 sliding on the outside surface of the sleeve 138 and attached to longitudinal supports 147 extending parallel to the shaft 116, around it and passing between the flyweights 132. These elongate supports 147 are attached to a cylindrical tubular portion 148 engaged over a sliding sleeve 149 that is an extension of the clamping plate 124. This portion 148 abuts axially against said plate. A damper system is disposed between a sleeve-shaped part 150 forming an axial extension of the plate 124 and a member 151 fastened to the shaft 116. These two coaxial cylindrical members, together with walls 152, 153 and 154 perpendicular to the shaft 116, define an annular cavity 155 filled with liquid. The wall 154, which is part of the member 151, divides the cavity into two chambers and this wall has small cross-section passages 156 passing through it. This arrangement forms a hydraulic damper coupled to the plate 124.

As in FIG. 1, the flyweights of the second set 143 are driven in rotation by the shaft 116 and co-operate with the diaphragm spring 125 to deform it by virtue of centrifugal forces in a direction tending to move it away from the clamping plate 124, so as to reduce progressively the clamping force on the first and second friction disks. The smaller flyweights 143 are carried by the diaphragm spring 125 itself.

Operation is as follows:

As a result of centrifugal force the flyweights 132 of the first set straighten up, the result of which is to move the sleeve 138 and the plate 134 towards the friction disks. This results in progressive clamping of the disks 120, 122 between them and progressive loading of the diaphragm spring 134. The components are designed and dimensioned to obtain a maximum load on the diaphragm spring at approximately 1,000 revolutions per minute. For higher speeds the opposite effect of the flyweights 143 becomes increasingly important and the clamping force decreases progressively with increasing speed until it is cancelled out entirely at around 3,200 revolutions per minute.

The invention may applied to heating any form of motorized vehicle, such as a boat, for example.

There is claimed:

1. Heat generator comprising a casing, mechanical friction means in said casing, a shaft adapted to be driven by a motor and adapted to rotate said friction means, means for sensing the speed of said shaft, modulator means responsive to said shaft speed adapted to apply to said friction means a clamping force conditioned by said shaft speed and means for interfacing a heat-exchange fluid to said casing, a first set of friction disks in said casing constrained to rotate with said shaft and movable along the axis of said shaft, a second set of friction disks in said casing alternating with the disks of said first set, movable along said axis and prevented from rotating, and a clamping plate adapted to slide axially to clamp the disks of said first and second sets, said modulator means being operative on said clamping plate, said modulator means comprising a first diaphragm spring and a first set of flyweights driven in rotation by said shaft and co-operating with said first diaphragm spring to deform it by virtue of centrifugal force in a direction tending to move it towards said clamping plate so as to initiate and to increase progressively the clamping force on said friction disks of said first and second sets.

2. Heat generator according to claim 1, wherein said modulator means comprise a second diaphragm spring and a second set of flyweights driven in rotation by said shaft and co-operating with said second diaphragm spring to deform it by virtue of centrifugal force in a direction tending to move it away from said clamping plate so as to decrease progressively the clamping force on said friction disks of said first and second sets.

3. Heat generator according to claim 2, wherein said second diaphragm spring to co-operate with said clamping plate, further comprising an intermediate plate movable axially on said shaft and an abutment member fastened to said shaft to limit movement of said intermediate plate towards said clamping plate, wherein said second diaphragm spring co-operates with said clamping plate.

4. Heat generator according to claim 3, wherein said diaphragm springs are driven in rotation by said shaft, the flyweights of said first set are on said first diaphragm spring and the flyweights of said second set are on said second diaphragm spring.

5. Heat generator comprising a casing, mechanical friction means in said casing, a shaft adapted to be driven by a motor and adapted to rotate said friction means, means for sensing the speed of said shaft, modulator means responsive to said shaft speed adapted to apply to said friction means a clamping force conditioned by said shaft speed and means for interfacing a heat-exchange fluid to said casing, a first set of friction disks in said casing constrained to rotate with said shaft and movable along the axis of said shaft, a second set of friction disks in said casing alternating with the disks of said first set, movable along said axis and prevented from rotating, and a clamping plate adapted to slide axially to clamp the disks of said first and second sets, said modulator means being operative on said clamping plate, said modulator means comprising at least two plates constrained to rotate with but movable axially on said shaft and flyweights or balls adapted to be positioned between said at least two plates by virtue of centrifugal force imparted to them by said shaft and wherein at least one of said at least two plates has its surface in contact with said flyweights or balls shaped to define a variable spacing between said at least two plates and thus to define at least in part a law governing modulation of the clamping force on said mechanical friction means.

6. Heat generator according to claim 5, wherein one of said at least two plates is said clamping plate.

7. Heat generator according to claim 5, comprising two pairs of plates and a respective set of balls enclosed between the plates of each pair, wherein the facing surfaces of the plates of a first pair define a space decreasing in size in the radially outward direction and the facing surfaces of the plates of the second pair define a space increasing in size in the radially outward direction at least from a specific radial distance from said shaft.

8. Heat generator according to claim 7, wherein said balls of the second set are held in place between said plates by a spring washer or like means.

9. Heat generator according to claim 7, wherein the plate of said first pair nearer a plate of said second pair is shaped to come into contact with said plate of said second pair so as to urge said second pair of plates in a direction tending to increase the clamping force on said mechanical friction means and the axial travel of said plate of said first pair is limited by an abutment member fastened to said shaft.

10. Heat generator according to claim 5, wherein said at least two plates have their facing surfaces shaped to define, in the radially outward direction, a first space decreasing in size in the radially outward direction and then a second space increasing in size in the radially outward direction and said balls disposed between said facing surfaces are held in position in the respective first or second space by a spring washer or like means.

11. Heat generator according to claim 7, further comprising spring means urging the plates of said first pair axially towards each other.

12. Heat generator comprising a casing, mechanical friction means in said casing, a shaft adapted to be driven by a motor and adapted to rotate said friction means, means for sensing the speed of said shaft, modulator means responsive to said shaft speed adapted to apply to said friction means a clamping force conditioned by said shaft speed and means for interfacing a heat-exchange fluid to said casing wherein said means for interfacing a heat exchange fluid to said casing comprises means for circulating a heat-exchange fluid in said casing, said modulator means comprising said clamping plate which is adapted to form a fluid-tight movable wall of said casing in which said the heat-exchange fluid circulates so that it is subjected to contrifugal pressure developed by the heat-exchange fluid and urged in a direction tending to reduce the clamping force on said mechanical friction means.

13. Heat generator according to claim 12, wherein said means for circulating the heat exchange fluid comprise a variable throughout pump adapted to be mechanically coupled to said motor and adapted to pump said heat-exchange fluid whereby an increase in the speed of said motor results in an increase in the pressure in said casing operative on said clamping plate serving as said fluid-tight movable wall of said casing.

14. Heat generator according to claim 13, wherein said pump is a gear pump adapted to be direct-coupled to said shaft.

15. Heat generator comprising a casing, mechanical friction means in said casing, a shaft adapted to be driven by a motor and adapted to rotate said friction means, means for sensing the speed of said shaft, modulator means responsive to said shaft speed adapted to apply to said friction means a clamping force conditioned by said shaft speed and means for interfacing a heat-exchange fluid to said casing, a first set of friction disks in said casing being constrained to rotate with said shaft and being moveable along the axis of said shaft, a second set of friction disks in said casing alternating with the disks of said first set, being movable along said axis and being prevented from rotating, and a clamping plate being adapted to slide axially to clamp the disks of said first and second sets, said modulator means being operative on said clamping plate, said modulator means comprising an annular diaphragm spring, a first set of flyweights rotationally coupled to said shaft, and shaped links whereby said flyweights are coupled to said diaphragm spring so as to deform said diaphragm spring by virtue of centrifugal force in a direction tending to move it closer to said clamping plate.

16. Heat generator according to claim 15, further comprising a support fixed to said shaft and to which said flyweights of said first set are pivoted, a sleeve sliding longitudinally along said shaft, a diaphragm spring support plate at one end of said sleeve and an annular groove in said sleeve, wherein each flyweight comprises a lever engaged in said groove.

17. Heat generator according to claim 16, further comprising a ring sliding on the outside surface of said sleeve and longitudinal supports coupled to said ring and fastened to said clamping plate and wherein an inside edge of said diaphragm spring bears against said ring.

18. Heat generator according to claim 15, further comprising a second set of flyweights driven in rotation by said shaft and co-operating with said diaphragm spring so as to deform it by virtue of centrifugal force in a direction tending to move it away from said clamping plate so as to reduce progressively the clamping force on said first and second friction disks.

19. Heat generator according to claim 18, wherein said flyweights of said second set are carried by said diaphragm spring.

20. Heat generator according to claim 15, further comprising two members defining an annular cavity, a bulkhead fastened to one member dividing said cavity into two chambers, passages of small cross-section in said bulkhead, and a damper system disposed between said members, one of which is fastened to said clamping plate and the other of which is fastened to said shaft.

21. Heat generator comprising a casing, mechanical friction means in said casing, means for interfacing a heat exchange fluid to said casing a shaft adapted to be driven by a motor and to rotate said friction means, modulator means responsive to the shaft of the shaft for applying speed to said friction means a clamping force progressively increasing as a function of the shaft speed in a predetermined low range of shaft speeds and progressively decreasing as a function of increasing shaft speed above the predetermined low range of shaft speeds.

22. Heat generator according to claim 21, wherein said means for interfacing a heat-exchange fluid to said casing comprises means for circulating a heat-exchange fluid in said casing.

23. Heat generator according to claim 21, wherein said means for interfacing a heat exchange fluid to said casing comprises a double wall defining a passage for a heat-exchange fluid.

24. Heat generator according to claim 21, further comprising a clutch, said shaft being mechanically coupled to said motor and thermostatic control means for said clutch thermally interfaced to the heat exchange fluid.

25. Heat generator according to claim 21, further comprising a limited speed range variable to speed drive whereby said shaft is coupled to said motor.

26. Heat generator according to claim 21, mounted on a motor vehicle having an engine, wherein said shaft is driven in rotation by the engine of said motor vehicle.

27. Heat generator according to claim 21, wherein said friction means are subjected to substantially no clamping force when said shaft is not driven and said modulator means comprise a first centrifugal system operative in a direction tending to increase progressively the clamping force as a function of the shaft speed in the predetermined low range of shaft speeds.

28. Heat generator according to claim 27, wherein said modulator means comprise a second centrifugal system operative in a direction tending to decrease progressively the clamping force as the shaft speed increases.

29. Heat generator according to claim 21, comprising a first set of friction disks in said casing constrained to rotate with said shaft and movable along the axis of said shaft, a second set of friction disks in said casing alternating with the disks of said first set, movable along said axis and prevented from rotating, and a clamping plate adapted to slide axially to clamp the disks of said first and second sets, said modulator means being operative on said clamping plate.

30. Heat generator according to claim 36, wherein said modulator means comprise a first diaphragm spring and a first set of flyweights driven in rotation by said shaft and co-operating with said first diaphragm spring to deform it by virtue of centrifugal force in a direction tending to move it towards said clamping plate so as to initiate and to increase progressively the clamping force on said friction disks of said first and second sets.

31. Heat generator according to claim 30, wherein said modulator means comprise a second diaphragm spring and a second set of flyweights driven in rotation by said shaft and co-operating with said second diaphragm spring to deform it by virtue of centrifugal force in a direction tending to move it away from said clamping plate so as to decrease progressively the clamping force on said friction disks of said first and second sets.

32. Heat generator according to claim 31, wherein said second diaphragm spring co-operates with said clamping plate, further comprising an intermediate plate movable axially on said shaft to which said second diaphragm spring is attached and an abutment member fastened to said shaft to limit movement of said intermediate plate towards said clamping plate, where said second diaphragm spring co-operates with said clamping plate.

33. Heat generator according to claim 32, wherein said diaphragm springs are driven in rotation by said shaft, the flyweights of said first set are on said first diaphragm spring and the flyweights of said second set are on said second diaphragm spring.

34. Heat generator according to claim 29, wherein said modulator means comprise at least two plates constrained to rotate with but movable axially on said shaft and flyweights or balls adapted to be positioned between said at least two plates by virtue of centrifugal force imparted to them by said shaft and wherein at least one of said at least two plates has its surface in contact with said flyweights or balls shaped to define a variable spacing between said at least two plates and thus to define at least in part a law governing modulation of the clamping force of said mechanical friction means.

35. Heat generator according to claim 21, wherein said modulator means comprise an annular diaphragm spring, a first set of flyweights rotationally coupled to said shaft, and shaped links whereby said flyweights are coupled to said diaphragm spring so as deform said diaphragm spring by virtue on centrifugal force in a direction tending to move it closer to said clamping plate.

36. Heat generator according to claim 34, further comprising a support fixed to said shaft and to which said flyweights of said first set are pivoted, a sleeve sliding longitudinally along said shaft, a diaphragm spring support plate at one end of said sleeve and an annular groove in said sleeve, wherein each flyweight comprises a lever engaged in said groove.

* * * * *